United States Patent
Muster

(12) United States Patent (10) Patent No.: US 12,447,204 B2
Muster (45) Date of Patent: Oct. 21, 2025

(54) PRIME-BOOST INFLUENZA VACCINE

(71) Applicant: VIVALDI BIOSCIENCES INC., Fort Collins, CO (US)

(72) Inventor: Thomas Muster, Vienna (AT)

(73) Assignee: VIVALDI BIOSCIENCES INC., Fort Collins, CO (US)

( * ) Notice: Subject to any disclaimer, the term of this patent is extended or adjusted under 35 U.S.C. 154(b) by 529 days.

(21) Appl. No.: 17/787,560

(22) PCT Filed: Dec. 18, 2020

(86) PCT No.: PCT/US2020/066049
§ 371 (c)(1),
(2) Date: Jun. 20, 2022

(87) PCT Pub. No.: WO2021/127463
PCT Pub. Date: Jun. 24, 2021

(65) Prior Publication Data
US 2022/0401549 A1 Dec. 22, 2022

(30) Foreign Application Priority Data
Dec. 20, 2019 (EP) ..................................... 19218440

(51) Int. Cl.
*A61K 39/145* (2006.01)
*A61P 31/16* (2006.01)
*A61K 39/00* (2006.01)

(52) U.S. Cl.
CPC ............ *A61K 39/145* (2013.01); *A61P 31/16* (2018.01); *A61K 2039/543* (2013.01); *A61K 2039/545* (2013.01); *A61K 2039/70* (2013.01)

(58) Field of Classification Search
CPC ........ A61K 2039/5254; A61K 2039/70; A61K 39/145; A61P 31/16; C12N 2760/16134; C12N 2760/16234
See application file for complete search history.

(56) References Cited

FOREIGN PATENT DOCUMENTS

WO    WO2020097923 A  *  5/2020  .............. A61P 31/16

OTHER PUBLICATIONS

Mossler et al. Vaccine, vol. 31, Issue 52, Dec. 16, 2013, pp. 6194-6200.*
Wang et al. ASM Journals, mBio. vol. 10, No. 5, pp. 1-20.*
Nicolodi et al. Vaccine, Jun. 19, 2019;37(28):3722-3729.*
Reeth et al. J Vaccine, Apr. 20, 2017, vol. 2 (11) pp. 1-11.*
Yo Han Jang, et al., "Pan-Influenza A Protection by Prime-Boost Vaccination with Cold-Adapted Live-Attenuated Influenza Vaccine in a Mouse Model", Frontiers in Immunology, vol. 9, Article 116 (2018), 17 pages.
Pui Wang et al., "Generation of DelNS1 Influenza Viruses: a Strategy for Optimizing Live Attenuated Influenza Vaccines", MBIO, vol. 10, No. 5, pp. e02180-19 (2019).
Nicolodi Christina et al., "Safety and immunogenicity of a replication-deficient H5N1 influenza virus vaccine lacking NS1", Vaccine, vol. 37, No. 28, pp. 3722-3729 (2019).
Volker Wacheck et al., "A Novel Type of Influenza Vaccine: Safety and Immunogenicity of Replication-Deficient Influenza Virus Created by Deletion of the Interferon Antagonist NS1", Journal of Infectious Diseases, vol. 201, No. 3, pp. 354-362 (2010).
Kristien Van Reeth et al., "Heterologous prime-boost vaccination with H3N2 influenza viruses of swine favors cross-clade antibody responses and protection", NPJ Vaccenes, vol. 2, No. 1 (2017), doi:10.1038/s41541-017-0012-x, 11 pages.
International Search Report and Written Opinion for corresponding International Patent Application No. PCT/US2020/66049, dated Mar. 5, 2021.

* cited by examiner

*Primary Examiner* — Bao Q Li
(74) *Attorney, Agent, or Firm* — LOZA & LOZA, LLP; Michael Fedrick

(57) ABSTRACT

The invention relates generally to the field of influenza vaccination, specifically to a two-component vaccine comprising influenza virus strains with native hemagglutinin (HA) and lacking the functional NS gene (delNSI influenza), for use in the vaccination of a subject, wherein a priming composition, comprising one, two or three delNSI influenza virus strains selected from group 1 influenza A virus, group 2 influenza A virus, or group 3, consisting of influenza B virus, is formulated for prime-administration prior to a boosting composition, comprising one, two or three delNSI influenza virus strains of the same group as in the priming composition but differing antigenically in the HA head, formulated for boost-administration. Further, a kit comprising said two-components and its use for preventing influenza virus infection is provided.

14 Claims, 4 Drawing Sheets

Fig. 3A

PRIME-BOOST INFLUENZA VACCINE

CROSS-REFERENCE TO RELATED APPLICATIONS

Figure 1:
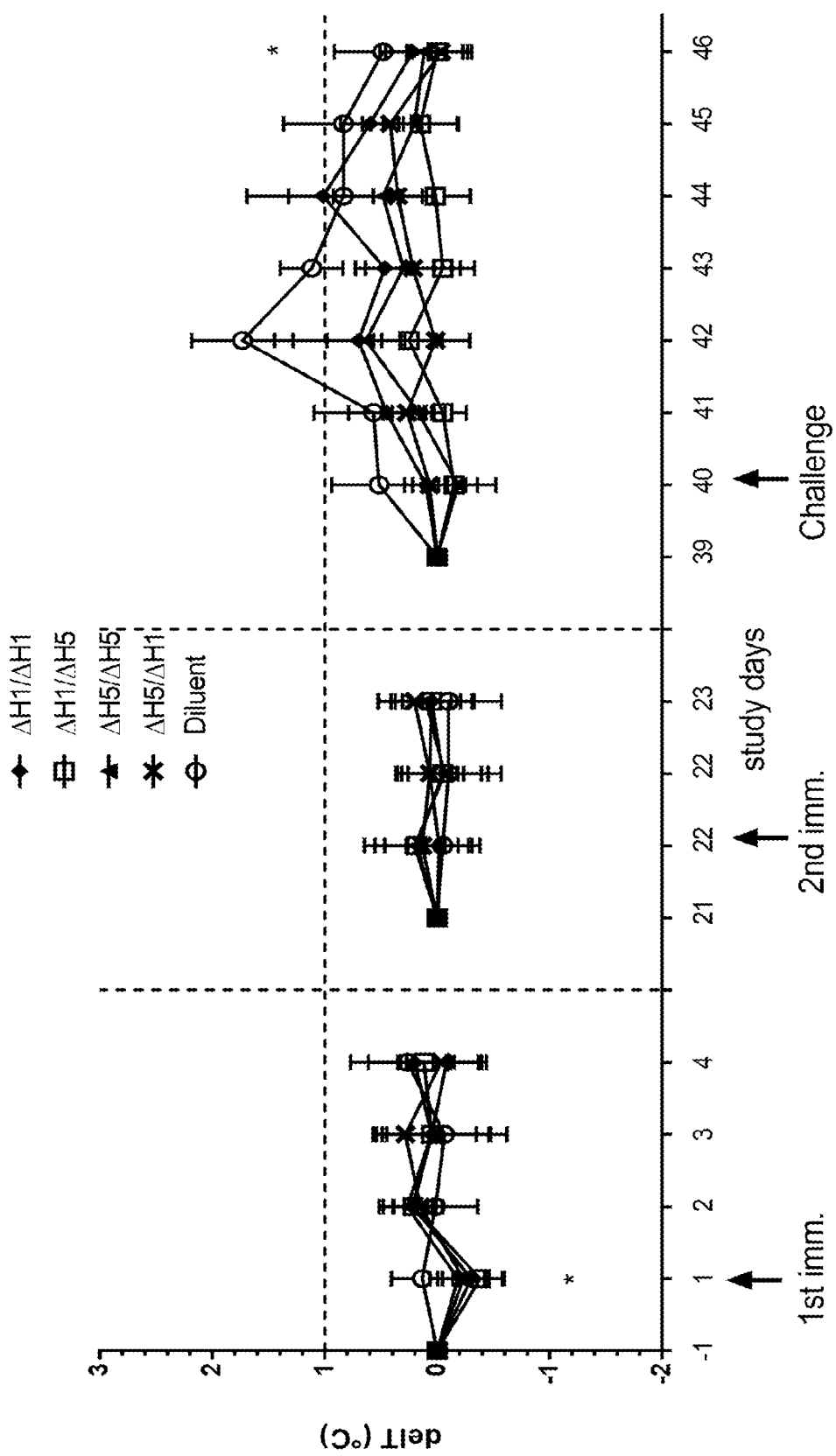

This application is the U.S. national stage of International Patent Application No. PCT/US2020/66049, filed on Dec. 18, 2020 and entitled NOVEL PRIME-BOOST INFLUENZA VACCINE, which claims the benefit of priority under 35 U.S.C. § 119 from European Patent Application No. 19218440.6, filed Dec. 20, 2019. The disclosures of the foregoing applications are incorporated herein by reference in their entirety.

FIELD OF THE INVENTION

The invention relates generally to the field of influenza vaccination, specifically to a two-component vaccine comprising influenza virus strains with native hemagglutinin (HA) and lacking the functional NS gene (delNS1 influenza), for use in the vaccination of a subject, wherein a priming composition, comprising one, two or three delNS1 influenza virus strains selected from group 1 influenza A virus, group 2 influenza A virus, or group 3 influenza B virus is formulated for prime-administration prior to a boosting composition, comprising one, two or three delNS1 influenza virus strains of the same group as in the priming composition but differing in the HA head, formulated for boost-administration. Further, a kit comprising said two-components and its use for preventing influenza virus infection is provided.

BACKGROUND OF THE INVENTION

Influenza A virus is one of the most common pathogens threatening humans and animals, with the potential to cause disastrous pandemics. Influenza A virus causes 300,000-500,000 deaths worldwide each year, and in pandemic years, this number increased to 1 million (in 1957-1958) or can be as high as 50 million, as was seen in 1918-1919. More recently, highly pathogenic avian influenza viruses (H5N1) have generated great concern regarding their potential to cause a pandemic. H5N1 infections in humans were seen in Hong Kong in a small outbreak in 1997 that resulted in 18 human infections and six fatalities, and reached up to now 383 human cases with a 61% fatality rate. In the spring of 2009, a novel influenza A (H1N1) virus emerged in North America and spread worldwide to cause the first influenza pandemic since 1968. During the first 4 months, over 500 deaths in the United States had been associated with confirmed 2009 pandemic influenza A (H1N1) virus infection (Shieh W. J. et al., 2010, The American Journal of Pathology, 177, 1, 166-175).

Due to the antigenic diversity and variability of the virus, an influenza vaccine must be adapted almost every year to match circulating strains. Currently used influenza vaccines provide only strain-specific protection, primarily by inducing neutralizing antibodies against surface glycoproteins, hemagglutinin (HA) and neuraminidase (NA) of the virus. In addition, the occurrence of influenza pandemics was often accompanied by zoonotic spillovers of the surface genes into the human-infecting viruses, rendering existing vaccines ineffective to newly emerging viruses.

In the last decade, a significant breakthrough has been made in the development of a universal influenza vaccine, triggered by the discovery of rare antibodies specific to the immunogenically less dominant but conserved stem region of influenza hemagglutinin. To redirect the host immune responses from the HA globular head domain toward this conserved stem domain, rational vaccine designs were developed, such as headless HA and chimeric HA vaccines (WO2014/099932). The HA stem-based approaches have been shown to induce a broader protection than preexisting influenza vaccines. However, the low protective efficacy against different HA group viruses, the necessity of multiple vaccinations to achieve sufficient protective efficacy, and the rare cases of adverse effects such as viral infectivity-enhancing activity of the HA stalk antibodies have led to major concerns. Furthermore, recent studies have isolated mutant influenza viruses each showing resistance to a particular HA stalk-specific antibody (Ekiert D C, et al., Science (2011) 333:843-50; Friesen R H et al., Proc Natl Acad Sci USA (2014) 111:445-50; Chai N. et al., PLoS Pathog (2016) 12: e1005702).

Inactivated influenza vaccines which are licensed in Europe have limited protection efficacy especially in elderly population and in small children who never experienced natural influenza. Cold-adapted live influenza vaccines are more effective in children preventing and curbing the spread of disease, but new technologies such as reverse genetics can now be used for further improvement of the live vaccine approach.

The use of cold adapted viruses in the development of a universal vaccine providing pan-influenza A protection has been described by Jang Y H. et al. (Frontiers in Immunology, 2018, 9, 116, 1-17). The concept is based on the generation of a temperature sensitive attenuated "master strain" adapted to grow at 25° C. (cold adaptation). Live cold adapted and inactivated virus vaccine stimulate the immune system differently, yet in both cases lack of sufficient immunogenicity especially in elderly persons is one of the most important drawbacks in influenza vaccination.

Although ca live influenza virus vaccines are considered as sufficiently safe, the exact genetic and molecular mechanisms of attenuation are not completely understood. It is claimed that the nature of the safety of cold-adapted influenza vaccines is based on a large number of point mutations distributed across the internal gene segments. However, only a small number of mapped mutations localized in the polymerase genes are responsible for the attenuation of cold-adapted virus strains that are unable to replicate at normal body temperature (Herlocher, M. L., et al., 1996, Virus Res. 42:11-25; Herlocher, M. L., et al., 1993, Proc Natl Acad Sci USA. 90:6032-6036). In fact, the genetic stability of live vaccine strains is often questioned since viruses re-isolated from vaccinated hosts reveal additional point mutations which might eventually function as "suppressor" mutations causing enhanced replication properties and a possible loss of the temperature sensitive phenotype of the revertant virus (Herlocher, M. L., et al., 1993, Proc. Natl. Acad. Sci. 90:6032-6036, Treanor, J., M. et al., 1994 J Virol. 68:7684-7688).

Wang P. et al. refer to the generation of a cold adapted delNS1 influenza virus, and its protective effect against challenge with homologous virus which shows cross-protection against heterosubtypic and antigenically distantly related influenza viruses (Frontiers in Immunology, 2018, Vol. 9).

Van Reeth K. et al. report heterologous prime-boost vaccination with antigenically distinct inactivated, adjuvanted H3N2 influenza viruses of swine. Antibodies to the conserved hemagglutinin stalk or to other hemagglutinin subtypes were not induced (NPJ Vaccines, 2017, Vol. 2 (1)).

Vaccination is critical for public health measures to protect the population against influenza infections. Previous studies have demonstrated that two doses of adjuvanted A (H5N1) vaccines administered as a prime-boost regimen are needed to elicit sufficient levels of antibody responses to confer protection (Treanor, J. J., et al., Safety and immunogenicity of an inactivated sub-virion influenza A (H5N1) vaccine. N. Engl. J. Med. 354, 1343-1351 (2006).) In the US, development of national vaccine stockpiles is an important measure to be prepared for pandemics. Further, candidate vaccine viruses are developed to match emerging strains. However, rapid evolution of the A(H5Nx) viruses requires constant adapting of vaccine viruses. In case of a pandemic, the likelihood of antigenic mismatch between the pandemic strain and stockpiled vaccine strains is fairly high. Even when the candidate virus becomes available, the existing vaccine manufacturing capacity may not be sufficient to provide enough quantities of matched vaccines rapidly to protect the entire population against the pandemic virus. Thus, improved influenza vaccination strategies can induce broader cross-reactive neutralizing antibody responses to emerging pandemic strains are highly desirable.

Heterologous prime-boost vaccination, using different delivery carriers and/or vectors, represents a promising strategy compared to homologous prime-boosting for the induction of T cell immunity due to diminished anti-viral vector antibody responses known to interfere with immunity against target antigen through the clearance of vaccine via vaccine-antibody immune complexes; and the potential for different vaccine technologies to stimulate the immune response differently and work synergistically. Heterologous prime-boost approaches have looked at the vaccines of various compositions but have recently mainly focused on DNA/viral vector or viral vector/viral vector combinations for clinical development. With the prospect of stimulating strong and durable T cell immunity, heterologous prime/boost vaccine strategies are of particular interest for acute and chronic viral infection, cancer, allergy and autoimmunity.

Although heterologous prime-boost vaccination, using different delivery carriers and/or vectors, is well known and represents an alternative strategy compared to homologous prime-boosting for providing pan-influenza protection, there is still an unmet demand for attenuated live influenza vaccine platforms for producing universal influenza vaccines.

SUMMARY OF THE INVENTION

It is the objective of the present invention to provide an improved universal influenza vaccine.

The objective is solved by the present invention.

According to the invention provided herein is a two-component vaccine comprising replication deficient influenza virus strains with native hemagglutinin (HA), which are lacking the functional NS gene (delNS1 influenza), for use in the vaccination of a subject, wherein
  i. a priming composition, comprising one, two or three delNS1 influenza virus strains selected from
    group 1 influenza A virus,
    group 2 influenza A virus, or
    group 3 having HAs derived from the Victoria and Yamagata influenza virus B lineages,
  is formulated for prime-administration prior to
  ii. a boosting composition, comprising one, two or three delNS1 influenza virus strains of the same group as in the priming composition but differing in the HA, specifically differing in the HA stalk domain, formulated for boost-administration.

Specifically, the subject is at risk of being infected with influenza virus and the two-component vaccine is for use in vaccination against influenza virus.

Specifically, vaccination refers to the prevention, prophylactic treatment or treatment of a subject being at risk of suffering from influenza virus infection or influenza virus disease, specifically wherein the subject is immunized using the replication deficient influenza virus strains.

Specifically, group 1 influenza virus consists of H1N1 and H5N1 influenza A virus, and/or group 2 influenza virus consists of H3N1 and H7N1 influenza A virus.

Group 3 influenza B viruses specifically comprises Victoria and Yamagata influenza B lineages.

According to a specific embodiment, the respective influenza virus strains of one group selected for prime and boost composition comprise native HA stalk domains that are antigenically similar or identical but HA heads that are antigenically different.

Most of the antibodies that bind the hemagglutinin stalk domain are generated from preexisting memory B cells. Broadly protective stalk-biased responses induced by antigenically divergent influenza strains, in concert with prior immunity, are sufficient to eradicate seasonally circulating strains.

Deletion of the NS1 protein leads to a significant attenuation of influenza virus due to lack of replication in interferon competent cells or organisms (replication deficient phenotype). Viruses lacking the NS1 protein are not able to antagonize cytokine production of infected cells, therefore inducing self-adjuvanting and immune modulating effects. The hallmark of immune response after immunization with delNS1 virus is triggering of Th1 type of immune response associated with predominant IgG2A antibody isotype response (Ferko B. et al., J. Virol., 2004, 78(23), 13037-45). The DelNS1 influenza virus backbone is highly advantageous in this regard due to increased T-cell response. Enhanced T-cell response may positively affect cross-reactivity of the HA stalk domain thus leading to increased memory effect of the cells and optimized vaccination effect of the prime/boost vaccine described herein. Moreover, it was demonstrated that immunization with delNS1 based viruses NS1 was also able to induce T-cells that were amenable to rapid boosting which is an important prerequisite for an efficient prime boost approach. Rapid prime-boost regimes may be beneficial for the administration of effective vaccines in humans since immunity could be generated fairly rapidly, with minimal time between doses. These improved T-cell responses are due to the release of interferon due to the lack of NS1 of delNS1-based viruses. Most importantly, recall responses by memory cells was not only stronger but also appeared faster with delNS1 vaccine viruses. (Mueller et al, J Virol. 2010, 84:1847-55). Thus, a delNS1 based prime boost approach has the big advantage to efficiently activate both arms of the immune system and is amenable to rapid boosting. In particular a faster recall response might be crucial for efficient T-cell mediated protection, since influenza viruses replicate rapidly.

Specifically, the influenza virus is a replication deficient influenza virus.

With the inventive two-component vaccine described herein and its use for the prime/boost administration scheme, a broad protection via cellular and antibody immunity to conserved stem of influenza HA antigen is successfully provided. The heterologous prime-boost directs immune response away from the variable HA head and boosts antibodies to the conserved HA stem/stalk domain to provide protection against all other influenza viruses.

In a specific embodiment, the boosting composition is administered 2 to 4 weeks after the priming composition, more specifically, the boosting composition is administered about 3 weeks after the priming composition.

According to a specific embodiment described herein, the delNS1 influenza virus of the priming composition preferably comprises a native HA with a H5 HA head, and the delNS1 influenza virus of the boosting composition comprises a native HA with a H1 HA head, or wherein the delNS1 influenza virus of the priming composition comprises a native HA with a H1 HA head, and the delNS1 influenza virus of the boosting composition comprises a native HA with a H5 HA head.

According to a specific embodiment described herein, the delNS1 influenza virus of the priming composition comprises a native HA with a H3 HA head, and the delNS1 influenza virus of the boosting composition comprises a native HA with a H7 HA head, or wherein the delNS1 influenza virus of the priming composition comprises a native HA with a H7 HA head, and the delNS1 influenza virus of the boosting composition comprises a native HA with an H3 HA head.

According to a specific embodiment described herein, the delNS1 influenza virus of the priming composition comprises a native HA with a B/Victoria lineage HA head, and the delNS1 influenza virus of the boosting composition comprises a native HA with a B/Yamagata lineage HA head, or wherein the delNS1 influenza virus of the priming composition comprises a native HA with a B/Victoria lineage HA head, and the delNS1 influenza virus of the boosting composition comprises a native HA with a B/Yamagata lineage HA head.

According to a specific embodiment, the priming composition comprises delNS1 influenza virus of group 1 influenza A, of group 2 influenza A and group 3 influenza B and the boosting composition comprises delNS1 influenza virus corresponding to the virus types of the priming composition, which delNS1 influenza virus differs in the HA head from the delNS1 influenza virus of the priming composition.

Herein provided is also a vaccine as described herein for use in the prevention of influenza related disease or infection.

Specifically, the subject is human, avian, equine, canine, feline, or porcine.

Further provided herein is a kit for prime-boost vaccination comprising at least two vials, wherein a first vial contains a priming composition comprising one, two or three delNS1 influenza virus strains from group 1 influenza A virus, group 2 influenza virus and/or group 3, consisting of Victoria and Yamagata influenza B virus, and a second vial contains a boosting composition comprising one, two or three delNS1 influenza virus strains of the same group as in the priming composition but differing in the HA head. Specifically, group 1 influenza virus consists of H1N1 and H5N1 influenza A virus, and/or group 2 influenza virus consists of H3N1 and H7N1 influenza A virus.

FIGURES

FIG. 1: Body temperature differences (delT° C.) of ferrets primed i.n., boosted three weeks later with delNS-H1N1 and/or delNS-H5N1 and subsequently challenged with an influenza A(H1N1)pdm09-like virus. The mean delT (° C.) body temperatures±SEM (N=6/group) is shown. The baseline body temperature of each ferret was calculated from BT measurements collected at D-3 to D-1 before the first immunization, D20 to D21 before the second immunization and D38 to D39 before the challenge infection. All immunized and control (Diluent) animals were challenged on D40 with the heterologous H1N1pdm virus. The delT(° C.) mean body temperatures±SEM. (N=6/group) are shown. The closed diamonds correspond to group 1 (prime delNS1-H1N1, boost delNS1-H1N1), the open squares to group 2 (prime delNS1-H1N1, boost delNS1-H5N1), closed triangles to group 3 (prime delNS1-H5N1, boost delNS1-H5N1), asterix to group 4 (prime delNS1-H5N1, boost delNS1-H1N1) and open circles to group 5 (prime diluent, boost diluent).

Figure 2:
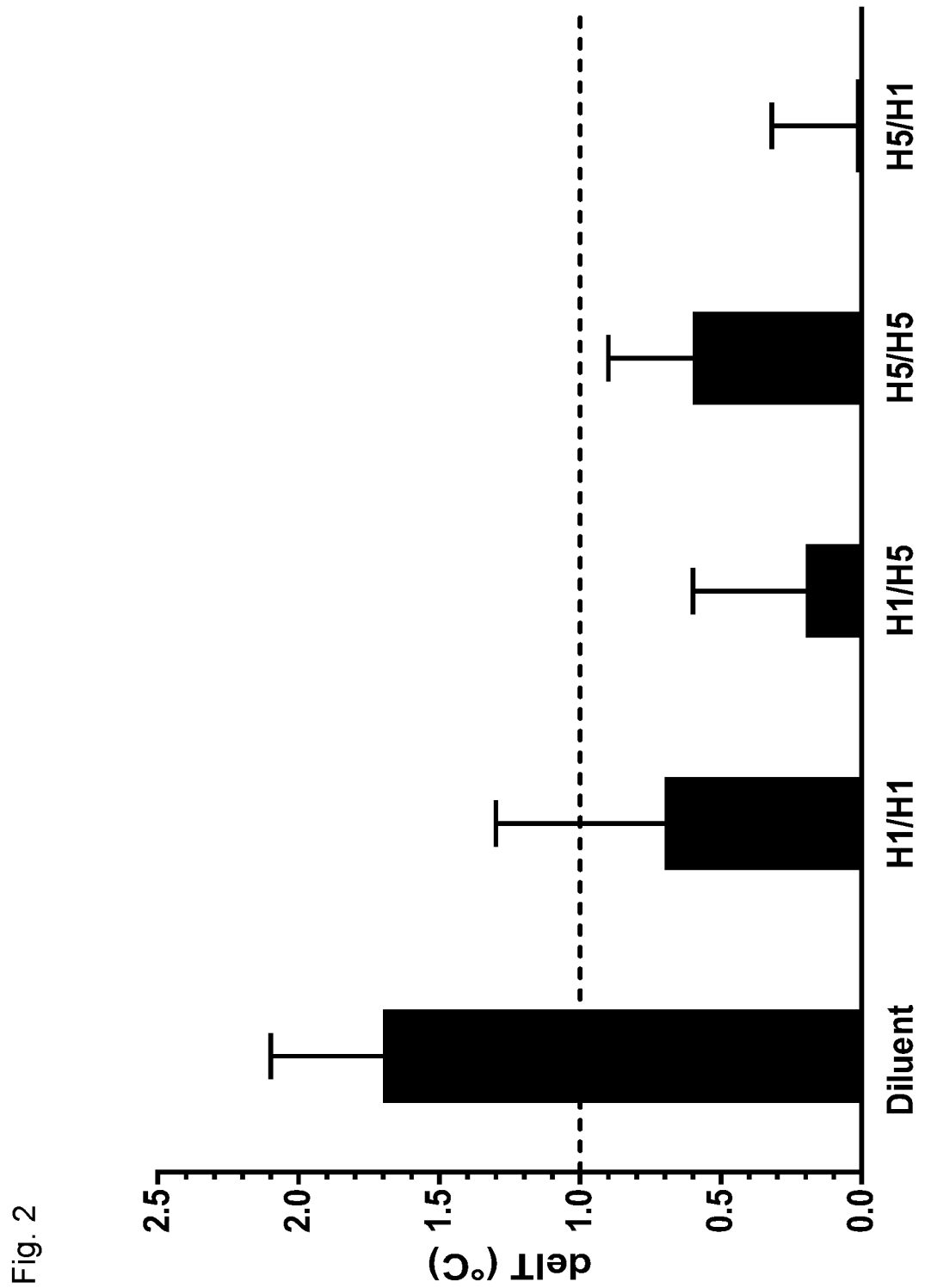

FIG. 2: Maximum average temperature increase 2 days after challenge.

FIG. 3 a) HA2 (stem)-specific ferret serum IgG. The sera are derived from the same experiment as described in FIG. 1 and were taken after the first and second immunization before challenge. As coating antigen, the HA2 of the Vietnam H5N1 strain, corresponding to the conserved stem was used. D-3 are naive sera, 2×delH1 were ferrets immunized twice with the delNS-H1N1 New Caledonia strains, delNSH1-delH5 was primed with delNS-H1N1 New Caledonia and boosted with delNS-H5N1 Vietnam, 2×delH5 twice with delNS-H5N1, delH5/delH1 was primed with delNS-H5N1 Vietnam and boosted with delNS-H1N1, and the diluent group was mock-treated twice with buffer.

b) HA1 (head—H1N1pdm09)-specific ferret serum IgG. The HA1 subunit of the pandemic H1N1pdm09 which corresponds to the challenge virus was used as coating antigen. The immunization scheme and the groups are identical to those described in FIG. 3a.

DETAILED DESCRIPTION

As used herein, the terms "a" or "an" are used, as is common in patent documents, to include one or more than one, independent of any other instances or usages of "at least one" or "one or more". As used herein, the term "or" is used to refer to a nonexclusive or, such that "A or B" includes "A but not B," "B but not A," and "A and B," unless otherwise indicated.

As used herein, the term "about" is used to refer to an amount that is approximately, nearly, almost, or in the vicinity of being equal to or is equal to a stated amount, e.g., the state amount plus/minus about 5%, about 4%, about 3%, about 2% or about 1%.

The compositions, formulations and methods of the present invention may comprise, consist essentially of, or consist of the components and ingredients of the present invention as well as other ingredients described herein. As used herein, "consisting essentially of" means that the compositions, formulations and methods may include additional steps, components or ingredients, but only if the additional steps, components or ingredients do not materially alter the basic and novel characteristics of the claimed compositions, formulations and methods.

The influenza virion consists of an internal ribonucleoprotein core (a helical nucleocapsid) containing the single-stranded RNA genome, and an outer lipoprotein envelope lined inside by a matrix protein (M1). The segmented genome of influenza A and B virus consists of eight segments, seven for influenza C, of linear, negative polarity, single-stranded RNAs which encode eleven, some influenza A strains ten, polypeptides, including the RNA-dependent RNA polymerase proteins (PB2, PB1 and PA) and nucleoprotein (NP) which form the nucleocapsid; the matrix membrane proteins (M1, M2 or BM2 for influenza B, respectively); two surface glycoproteins which project from the lipid containing envelope: hemagglutinin (HA) and neuraminidase (NA); the nonstructural protein (NS1) and the nuclear export protein (NEP, also: NS2). Influenza B viruses encode also NB, a membrane protein which might have ion channel activity and most influenza A strains also encode an eleventh protein (PB1-F2) believed to have proapoptotic properties. Transcription and replication of the genome takes place in the nucleus and assembly occurs via budding on the plasma membrane. The viruses can reassort genes during mixed infections. Influenza virus adsorbs via HA to sialyloligosaccharides in cell membrane glycoproteins and glycolipids. Following endocytosis of the virion, a conformational change in the HA molecule occurs within the cellular endosome which facilitates membrane fusion, thus triggering uncoating. The nucleocapsid migrates to the nucleus where viral mRNA is transcribed. Viral mRNA is transcribed and processed by a unique mechanism in which viral endonuclease cleaves the capped 5'-terminus from cellular heterologous mRNAs which then serve as primers for transcription from viral RNA templates by the viral transcriptase. Transcripts terminate at sites 15 to 22 bases from the ends of their templates, where oligo(U) sequences act as signals for the addition of poly(A) tracts. Of the eight viral RNA molecules of influenza A virus so produced, six are monocistronic messages that are translated directly into the proteins representing HA, NA, NP and the viral polymerase proteins, PB2, PB1 and PA. The other two transcripts undergo splicing, each yielding two mRNAs which are translated in different reading frames to produce M1, M2, NS1 and NS2. In most of influenza A viruses, segment 2 also encodes for a second protein (PB1-F2), expressed from an overlapping reading frame. In other words, the eight viral RNA segments code for eleven proteins: nine structural and 2 non-structural (NS1, PB1-F2) proteins.

The influenza virus as described herein can be also useful to prepare reassortant viruses including 6:1:1 reassortants, 6:2 reassortants and 7:1 reassortants. A 6:1:1 reassortant according to the present invention is an influenza virus with 6 internal gene segments, an NA gene segment from a different, second, viral isolate, and a HA gene segment from a third isolate; a 6:2 reassortant is an influenza virus with 6 internal gene segments, and an NA gene segment and a HA gene segment from a different (second) viral isolate; and a 7:1 reassortant is an influenza virus with 6 internal gene segments and an NA gene segment from a vaccine virus, and a HA gene segment from a different viral source than the vaccine virus, or an influenza virus with 6 internal gene segments and a HA gene segment, and an NA gene segment is from a different viral source than the vaccine virus. As an alternative, 5:1:2 reassortants are also encompassed herein. The term "two-component" as used herein refers to a vaccine comprising influenza virus strains with native hemagglutinin (HA) while lacking the functional NS gene (delNS1 influenza) comprising a priming composition formulated for prime-administration prior to a boosting composition, comprising one, two or three influenza virus strains of the same groups as in the priming composition but differing in the HA. head.

The two-component composition described herein may comprise a prime composition comprising one influenza virus strain and a boosting composition comprising one influenza virus strain of the same group but differing in the HA, specifically in the HA stalk domain. The two-component composition comprising one influenza virus strain may herein be termed monovalent vaccine composition.

The two-component composition described herein may alternatively comprise a prime composition comprising two different influenza virus strains and a boosting composition comprising two different influenza virus strains of the same groups, but differing in the HA, specifically in the HA stalk domains. The two-component composition comprising two different influenza virus strains may be termed bivalent vaccine composition.

The two-component composition described herein may alternatively comprise a prime composition comprising three different influenza virus strains and a boosting composition comprising three different influenza virus strains of the same groups, but differing in the HA, specifically in the HA stalk domains. The three-component composition comprising three different influenza virus strains may be termed trivalent vaccine composition.

Due to the lack of functional NS1 protein (delNS1), the influenza virus strains are replication efficient.

The lack of NS1 activity achieves highly advantageous properties for the deltaNS1 life attenuated virus (LAIV). Specifically when delivered intranasally, it infects cells of the upper respiratory tract and expresses viral antigens, but it does not form viral progeny and the vaccine strains are not shed by the recipient, making deltaNS1 LAIV vaccines very safe; and, additionally, since deltaNS1 strains are unable to counteract the host interferon (IFN) response, deltaNS1 infection induces high levels of interferon, achieving a natural adjuvant effect that activates B and T cell-mediated immune responses.

Moreover, deltaNS1 virus stimulates cross-neutralizing serum antibodies against drift variants (Wacheck V. et al., J. Infect. Dis., 2010, 201(3), 354-62), and cross-neutralizing mucosal IgA against different influenza A subtypes (Morokutti A. et al., Vaccine, 2014, 32(17), 1897-1900). Clinical data also indicate that pandemic deltaNS1 has potential for superior immunity (Nicolodi et al. Vaccine 0.2019, 37, 3722-372).

According to the invention, the term "replication deficient" is defined as replication rate in interferon competent host cells that is at least less than 5%, preferably less than 1%, preferably less than 0.1% compared to wild type influenza virus replication rate, determined by hemagglutination assay, TCID50 assay or plaque assay as well known in the art.

The functionality of the NS1 protein is completely diminished. The NS1 protein lacks the functional RNA binding domain and/or the carboxy terminal domain of the influenza NS1 protein might be rendered non-functional.

In an embodiment, the NS1 protein comprises a deletion of at least 50% of the NS1 amino acids, preferably of at least 70%, more preferably of at least 90%. This domain can be completely or partially deleted as well as amino acids can be substituted or inserted and the remaining domain can be tested for functionality as described in the art (Dauber et al, J Virol. 2006, December; 80(23): 11667-77).

In an alternative embodiment, the influenza virus comprises a truncated NS1 protein that contains up to 122 amino acids, preferably up to 121 amino acids, preferably up to 120 amino acids, preferably up to 119 amino acids, preferably up to 118 amino acids, preferably up to 117 amino acids, preferably up to 116 amino acids, preferably up to 115 amino acids, preferably up to 114 amino acids, preferably up to 113 amino acids, preferably up to 112 amino acids, preferably up to 111 amino acids, preferably up to 110 amino acids, preferably up to 109 amino acids, preferably up to 108 amino acids, preferably up to 107 amino acids, preferably up to 106 amino acids, preferably up to 105 amino acids, preferably up to 104 amino acids, preferably up to 103 amino acids, preferably up to 102 amino acids, preferably up to 101 amino acids, preferably up to 100 amino acids, preferably up to 99 amino acids, preferably up to 98 amino acids, preferably up to 97 amino acids, preferably up to 96 amino acids, preferably up to 95 amino acids, preferably up to 94 amino acids, preferably up to 93 amino acids, preferably up to 92 amino acids, preferably up to 91 amino acids, preferably up to 90 amino acids, preferably up to 89 amino acids, preferably up to 88 amino acids, preferably up to 87 amino acids, preferably up to 86 amino acids, preferably up to 85 amino acids, preferably up to 84 amino acids, preferably up to 83 amino acids, preferably up to 82 amino acids, preferably up to 81 amino acids, preferably up to 80 amino acids, preferably up to 79 amino acids, preferably up to 78 amino acids, preferably up to 77 amino acids, preferably up to 76 amino acids, preferably up to 75 amino acids, preferably up to 74 amino acids, preferably up to 73 amino acids of the N-terminus of the NS1 protein.

According to a specific embodiment, the NS1 protein comprises ≤73 amino acids of the N-terminus.

It was demonstrated that deletion of the NS1 protein or functional knock-out of the protein leads to a significant attenuation of influenza virus due to lack of replication in interferon competent cells or organisms (replication deficient phenotype). Viruses lacking the NS1 protein are not able to antagonize cytokine production of infected cells, therefore inducing self-adjuvanting and immune modulating effects. The hallmark of immune response after immunization with delNS1 virus is triggering of Th1 type of immune response associated with predominant IgG2A antibody isotype response (B. Ferko et al. 2004).

The influenza virus described herein can be human or animal influenza virus, such as, but not limited to avian, equine, swine.

As referred herein, the term "group 1 Influenza virus" refers to the group of influenza A viruses having HA group 1 hemagglutinin, specifically HA stalk and head domains of group 1 HA. Said group 1 influenza virus contains H1, H2, H5, H6, H8, H9, H11, H12, H13, H16, H17 and H18. In some embodiments, the H1 influenza virus is influenza A/New Caledonia/20/1999 (H1N1), A/Puerto Rico/8/34 (H1N1), or A/Vietnam1203/04 (H5N1)-like virus.

As referred herein, the term "group 2 Influenza virus" refers to the group of influenza A viruses having HA group 2 hemagglutinin epitope. Said group 2 influenza virus contains H3, H4, H7, H10, H14, and H15. In some embodiments, the H3 influenza virus is influenza A/Hong Kong/4801/2014 (H3N2), A/Brisbane/10/2007(H3N2), A/Texas/1/77(H3N2)-like virus.

In some embodiments, the H7 influenza virus is influenza A/Anhui/1/2013 (H7N2)-like virus.

As referred herein, the term "group 3 Influenza virus" refers to the group of influenza B viruses having HA group 3. Said group 3 influenza virus contains influenza virus of B/Victoria, B/Yamagata. Said viruses can specifically be B/Victoria/2/87 representative, abbreviated B/Victoria, and B/Yamagata/16/88 representative, abbreviated B/Yamagata.

According to a specific embodiment, influenza B/Lee 1940 strain is encompassed herein as group 3 influenza virus, being the ancestral strain of B/Yamagata and B/Victoria.

The terms "hemagglutinin" and "HA" refer to any influenza virus hemagglutinin. In certain embodiments, the hemagglutinin is influenza hemagglutinin, such as an influenza A hemagglutinin, an influenza B hemagglutinin, or an influenza C hemagglutinin. A typical hemagglutinin comprises domains known to those of skill in the art including a signal peptide (optional), a stem domain (also referred to as a "stalk domain"), a globular head domain, a luminal domain (optional), a transmembrane domain (optional) and a cytoplasmic domain (optional). Functionally, the hemagglutinin glycoprotein is composed of an immunodominant globular head domain involved in virus attachment to the host cell and the membrane proximal stalk/stem domain mediating fusion of the viral and cell membrane in the host endosome. The terms "stalk" and "stem" can be used interchangeably herein. The stalk domain is more conserved among influenza A (group 1 and 2) and B viruses allowing antibodies that target this region to neutralize a wide spectrum of influenza virus subtypes and is identified to harbor neutralizing B-cell epitopes. Thus the HA stalk domains are conserved among influenza A virus groups whereas the immunodominant HA head domains undergo constant antigenic drift or shift The HA stalk domain is composed of three helical bundles and is functionally required for the pH induced conformational changes involved in membrane fusion during viral entry and exit from the host cell. In contrast to the HA-head variability, the stalk domain displays a much higher level of conservation across influenza strains with some central residues being identical across all subtypes (Krystal M, et al., Proc Natl Acad Sci USA. 1982; 79:4800-4804). The stalk domain is evolving at a rate that is significantly slower than that of the head domain. Additionally, the cross-reactive epitopes in the stalk domain targeted by broadly neutralizing monoclonal antibodies are evolving at an even slower rate compared to the full head and stalk regions of the protein (Kirkpatrick E. et al., Scientific Reports, 2018, 8: 10432, 1-14). Three protective epitopes, with varying levels of cross-reactivity between group 1 and 2 influenza strains, have been identified within the stalk portion of influenza A HA_Epitope 1 is centered on the A α-helix of the HA2 region of HA. Targeting this epitope is also protective against B strains, but the antibody must have unique properties to accommodate key modifications helping to obscure the epitope surface (Dreyfus C, et al, Science. 2012; 337:1343-1348). Epitopes 2 and 3 are protective across group 2 influenza A subtypes. Epitope 2 includes the upper portion of the long alpha helix CD in HA2 (Wang T T, et al., PLoS Pathog. 2010; 6: e1000796.) whereas epitope 3 is located at the base of the HA2 stalk spanning regions of the fusion peptide and helix-capping loops (Ekiert D C, et al., Science. 2011; 333:843-850). The fourth protective stalk epitope is located in the C terminal portion of HA1 and offers broad protection across both B strain lineages (Yasugi M, et al., PLoS Pathog. 2013; 9: e10031) Generating a strong antibody response against any of these conserved epitopes can offer broader and more durable protection against influenza by circumventing reliance on epitopes prone to antigenic drift.

As used herein, the terms "HA head" or "HA head domain" and "influenza virus hemagglutinin head domain" refer to the globular head domain of an influenza hemagglutinin polypeptide. The intervening amino acid sequence between residues C52 and C277, according to H3 numbering, of an influenza virus HA represents an exemplary influenza virus HA globular head domain.

The term "antigenically different" as used herein refers to the presence of different antigenic sites being target by antibody response. Different antigenicity can be due to amino acid substitutions in the HA head domains due to antigenic drifts and shifts of the influenza virus. The 'classical' antigenic sites were historically determined using murine mAbs and analysis of changes in amino acid sequences connected to antigenic drift (as measured by reduction of HI activity, Underwood and Wiley et al., Nature 289, 373-378 (1981). The majority of mutations in the head were focused on sites related to immune escape, while the majority of mutations in the stalk seem to be evenly dispersed throughout the domain. (Kirkpatrick et al., 2018).

As used herein, the term "infection" means the invasion by, multiplication and/or presence of a virus in a cell or a subject. An infection can be an "active" infection, i.e., an infection in which the virus is replicating in a cell or a subject. Such an infection is characterized by the spread of the virus to other cells, tissues, and/or organs, from the cells, tissues, and/or organs initially infected by the virus. An infection may also be a latent infection, i.e. an infection in which the virus is not replicating. In certain embodiments, an infection refers to the pathological state resulting from the presence of the virus in a cell or a subject, or by the invasion of a cell or subject by the virus.

As used herein, the term "influenza virus disease" refers to the pathological state resulting from the presence of an influenza (e.g., influenza A or B) virus in a cell or subject or the invasion of a cell or subject by an influenza virus. In specific embodiments, the term refers to a respiratory illness caused by an influenza virus.

As used herein, the term "nucleic acid" includes DNA molecules (e.g., cDNA) and RNA molecules (e.g., mRNA or pre-mRNA) and analogs of the DNA or RNA generated using nucleotide analogs. The nucleic acid can be single-stranded or double-stranded.

As used herein, the terms "prevent," "preventing" and "prevention" in the context of the administration of a therapy to a subject to prevent an influenza virus disease refer to one or more of the prophylactic/beneficial effects resulting from the administration of a therapy or a combination of therapies. In a specific embodiment, the terms "prevent," "preventing" and "prevention" in the context of the administration of a therapy to a subject to prevent an influenza virus disease refer to one or more of the following effects resulting from the administration of a therapy or a combination of therapies: (i) the inhibition of the development or onset of an influenza virus disease or a symptom thereof; (ii) the inhibition of the recurrence of an influenza virus disease or a symptom associated therewith; and (iii) the reduction or inhibition in influenza virus infection and/or replication.

Specifically, the term "prophylaxis" or "prophylactic" refers to preventive measures which are intended to reduce the risk of disease occurrence, or recurrence of disease. When provided prophylactically, the two-component vaccine described herein is provided before any symptom or clinical sign of an influenza infection becomes manifest. The prophylactic administration of the preparation serves to prevent or attenuate any subsequent infection. When provided prophylactically, the two-component vaccine of the invention is provided before any symptom or clinical sign of a disease becomes manifest. Prophylactic treatment as used herein induces adaptive specific immunity in a subject. The prophylactic administration of the preparation serves to prevent or attenuate one or more symptoms or clinical signs associated with the disease caused by a virus infection, specifically caused by influenza virus infection. The adaptive immune system, also called acquired immunity, uses specific antigens to strategically mount an immune response. Unlike the innate immune system, which attacks only based on the identification of general threats, the adaptive immunity is activated by exposure to the two-component vaccine preparation described herein, and uses an immunological memory to learn about the threat and enhance the immune response accordingly. Unlike the innate immune system, the adaptive immune system relies on B cells and T cells.

Herein, "Adaptive specific immunity" refers to influenza specific B- and T cell response.

As used herein, the terms "subject" or "patient" are used interchangeably to refer to an animal (e.g., birds, reptiles, and mammals). In a specific embodiment, the subject is a bird. In another embodiment, the subject is a mammal including a non-primate (e.g., a camel, donkey, zebra, cow, pig, horse, goat, sheep, cat, dog, rat, and mouse) and a primate (e.g., a monkey, chimpanzee, and a human). In certain embodiments, the subject is a non-human animal. In some embodiments, the subject is a farm animal or pet. In another embodiment, the subject is a human.

As used herein, the terms "treat," "treatment," and "treating" refer to prophylactic treatment, i.e. to the immunization or vaccination of a subject and to therapeutic treatment.

As used herein, the terms "treat," "therapeutic treatment," and "therapeutically treating" refer in the context of administration of a therapy to a subject to treat an influenza virus disease or infection to obtain a beneficial or therapeutic effect of a therapy or a combination of therapies. In specific embodiments, such terms refer to one, two, three, four, five or more of the following effects resulting from the administration of a therapy or a combination of therapies: the reduction or amelioration of the severity of an influenza virus infection or a disease or a symptom associated therewith; the reduction in the duration of an influenza virus infection or a disease or a symptom associated therewith; the regression of an influenza virus infection or a disease or a symptom associated therewith; the reduction of the titer of an influenza virus; the reduction in organ failure associated with an influenza virus infection or a disease associated therewith; the reduction in hospitalization of a subject; the reduction in hospitalization length; the increase in the survival of a subject; the elimination of an influenza virus infection or a disease or symptom associated therewith; the inhibition of the progression of an influenza virus infection or a disease or a symptom associated therewith; the prevention of the spread of an influenza virus from a cell, tissue, organ or subject to another cell, tissue, organ or subject; the inhibition or reduction in the entry of an influenza virus into a host cell(s); the inhibition or reduction in the replication of an influenza virus genome; the inhibition or reduction in the synthesis of influenza virus proteins; the inhibition or reduction in the release of influenza virus particles from a host cell(s); and/or the enhancement or improvement the therapeutic effect of another therapy.

The "protection" provided need not be absolute, i.e., an influenza infection need not be totally prevented or eradicated, as long as there is a statistically significant improvement compared with a control population or set of mammals, specifically of humans. Protection may be limited to reducing the severity or rapidity of onset of symptoms or clinical signs of the influenza virus infection. According to a specific embodiment, the two-component vaccine described herein can further comprise one or more adjuvants. As used herein, an "adjuvant" refers to a substance that enhances the body's immune response to an antigen, in the present disclosure an adjuvant enhances the cell mediated immune response induced by the combination of the first composition, second composition and/or third composition. As used herein, an adjuvant is combined into any or all of the priming composition and/or boosting composition.

By "administration" is meant introducing the two-component vaccine composition of the present disclosure into a subject; it may also refer to the act of providing the vaccine of the present disclosure to a subject (e.g., by prescribing). The two-component vaccine combination can be administered to a human or animal subject in vivo using a variety of known routes and techniques. For example, the compositions of the two-component vaccine may be provided as an injectable solution, suspension or emulsion and administered via parenteral, subcutaneous, oral, epidermal, intradermal, intramuscular, intraarterial, intraperitoneal, intravenous injection using a conventional needle and syringe, or using a liquid jet injection system. The composition of the two-component vaccine may be administered topically to skin or mucosal tissue, such as nasally, intratracheally, intestinally, sublingually, rectally or vaginally, or provided as a finely divided spray, such as a mist, suitable for respiratory or pulmonary administration. In certain embodiments, the two-component vaccine compositions are administered intramuscularly or intranasally.

The term "effective amount" refers to that amount of the compound being administered which will produce a reaction that is distinct from a reaction that would occur in the absence of the compound. In reference to embodiments of the disclosure including the immunotherapy compounds of the disclosure, an "effective amount" is the amount which increases the immunological response in the recipient over the response that would be expected without administration of the compound.

A "pharmaceutical composition" refers to a mixture of one or more of the vaccine strains described herein, derivatives thereof, or pharmaceutically acceptable salts thereof, with other chemical components, such as pharmaceutically acceptable carriers and excipients. One purpose of a pharmaceutical composition is to facilitate administration of a compound to the organism.

As used herein, a "pharmaceutically acceptable carrier" refers to a carrier or diluent that does not cause significant irritation to an organism and does not abrogate the biological activity and properties of the administered vaccine compositions. This general concept of a prime-boost regimen is well known to the skilled person in the vaccine field. Prime-boost vaccination is used herein for prophylactic treatment of a patient who is at risk of being infected with a virus, specifically with influenza virus. Thus, in one embodiment, the priming composition of the two-component vaccine composition is a primer vaccine formulation comprising one, two or three delNS1 influenza virus strains selected from group 1 influenza A virus having group 1 HA, group 2 having group 2 HA, or group 3 having influenza B HAs derived from the Victoria and Yamagata lineages, to be used for priming an immune response, the boosting composition is a booster vaccine comprising one, two or three delNS1 influenza virus strains of the same group as in the priming composition but antigenically differing in the HA, formulated for boost-administration to be used for boosting an immune response. As described herein, the first, priming composition is administered as a prime dose and the second boosting composition is administered as a boost dose, provided both the first and second compositions are administered. In embodiments, the prime and boost dose are administered 2 to 4 weeks, specifically at least 7 days, at least 14 days, at least 21 days, specifically at least 28 days apart, or longer. In embodiments, the prime dose and boost dose are administered about 7 days, about 14 days, about 21 days apart, about 28 days apart, about 35 days apart, about 42 days apart, about 49 days apart, 56 days, 63 days, 70 days, 77 days, 84 days, 91 days, 98 days, 105 days, 112, 119 days, 126 days, 133 days, 140 days, 147 days, 154 days, 161 days, 168 days, about 175 days, or about 183 days apart.

In certain embodiments, the prime administration and boost administration are administered about 1 week apart, about 2 weeks apart, about 3 weeks apart, about 4 weeks apart, about 5 weeks apart, about 6 weeks apart, about 7 weeks apart, about 8 weeks apart, about 9 weeks apart, about 10 weeks apart, about 11 weeks apart, about 12 weeks apart, about 13 weeks apart, about 14 weeks apart, about 15 weeks apart, about 16 weeks apart, about 17 weeks apart, about 18 weeks apart, about 19 weeks apart, about 20 weeks apart, about 21 weeks apart, about 22 weeks apart, about 23 weeks apart, about 24 weeks apart, about 25 weeks apart, about 26 weeks apart, about 27 weeks apart, about 28 weeks apart, about 29 weeks apart, or about 30 weeks apart In certain other embodiments, the prime dose and boost dose are administered about 1 month apart, about 2 months apart, about 3 months apart, about 4 months apart, about 5 months apart, about 6 months apart, about 7 months apart, about 8 months apart, about 9 months apart, about 10 months apart, about 11 months apart, or about 12 months apart.

As general guidance, an immunologically effective amount when used with reference to a viral vaccine can range from about $1 \times 10^7$ viral particles per dose to about $1 \times 10^{12}$ viral particles per dose. An immunologically effective amount can be about $6 \times 10^{10}$, about $7 \times 10^{10}$, about $8 \times 10^{10}$, about $9 \times 10^{10}$, about $1 \times 10^{11}$, viral particles per dose.

The kit for prime-boost vaccination as referred herein comprises at least two separate vials:
the first vial contains a priming composition comprising a delNS1 influenza virus which is from group 1 influenza A virus consisting of H1N1 and H5N1, group 2 consisting of H3N1 and H7N1 or group 3, consisting of Victoria and Yamagata influenza B virus, specifically containing an effective amount in the range of about $7 \times 10^{10}$ to $8 \times 10^{10}$ TCID50 and
the second vial contains a boosting composition comprising a delNS1 influenza virus of the same group as in the priming composition but differing in the HA head, specifically containing an effective amount of about $7 \times 10^{10}$ to $8 \times 10^{10}$ TCID50, and optionally a leaflet comprising information on the appropriate administration sequence and dosage.

The examples described herein are illustrative of the present invention and are not intended to be limitations thereon. Different embodiments of the present invention have been described according to the present invention. Many modifications and variations may be made to the techniques described and illustrated herein without departing from the spirit and scope of the invention. Accordingly, it should be understood that the examples are illustrative only and are not limiting upon the scope of the invention.

EXAMPLES

Example 1

The aim of this study was to evaluate the safety, protection efficacy and the optimal sequence of intranasal administration of the two replication-deficient delNS1 strains A/Vietnam/1203/2004 H5N1 (delNS-H5N1) and A/New Caledonia/20/1999 H1N1 (delNS-H1N1) against challenge with influenza virus A(H1N1)pdm09-like virus (A/Vie/1H1/2009) in ferrets. delNS1-H5N1 lacks the complete NS1 open reading frame and was rescued from cDNA clones by co-transfection of plasmids encoding the hemagglutinin, neuraminidase and matrix protein of influenza A/Vietnam/1203/04(H5N1), whereas the remaining internal 5 gene segments are from the influenza virus IVR-116 (WHO).

IVR-116 is a reassortant with HA and NA genes from influenza A/NewCaledonia/20/99(H1N1), the PB1 gene from A/Texas/1/77(H3N2), and all other genes from the A/Puerto Rico/8/34 (H1N1)(PR8) virus. The HA cleavage site of the seed virus was genetically modified to remove the highly pathogenic trait of the H5N1 virus (Nicolodi et al 2019). delNS1-H1N1 was rescued by co-transfecting plasmids derived from the surface glycoproteins from A/NC/20/99 with plasmids corresponding to the internal gene segments derived from the influenza virus strain IVR-116. The NS1 open reading frame was deleted from the NS gene segment of IVR-116 (Wacheck et al 2010).

Prime/Boost H5-deINS1/H1-deINS1In Ferret Model (Table 1):

| Allocation and dosing | | | |
|---|---|---|---|
| Group | Animals, Sex | Prime (Day 1) | Boost (Day 22) | Challenge (Day 40) |
| 1 | 3 M + 3 F | delNS-H1N1 | delNS-H1N1 | H1N1pdm09 |
| 2 | 3 M + 3 F | delNS-H1N1 | delNS-H5N1 | H1N1pdm09 |
| 3 | 3 M + 3 F | delNS-H5N1 | delNS-H5N1 | H1N1pdm09 |
| 4 | 3 M + 3 F | delNS-H5N1 | delNS-H1N1 | H1N1pdm09 |
| 5 | 3 M + 3 F | diluent | diluent | H1N1pdm09 |

The ferrets of Group 1 and Group 2 (N=6/group) were immunized i.n. on study day 1 (D1) with delNS-H1N1 (dose: $10^{8.0}$ fTCID$_{50}$ in 280 µl). Ferrets of Group 3 and Group 4 were immunized i.n. with delNS-H5N1 (dose: $10^{8.0}$fTCID$_{50}$ in 280 µl). On D22, ferrets in Gr. 1 and Gr. 4 were boosted i.n. with delNS-H1N1 (dose: $10^{8.0}$ fTCID$_{50}$ in 280 µl), whereas ferrets in Group 2 and Group 3 i.n. received delNS-H5N1 (dose: $10^{8.0}$ fTCID$_{50}$ in 280 µl). Ferrets of Group 5 (N=6/group) were i.n. immunized with 280 µl of diluent (SHNP buffer)/ferret on D1 and D22.

At D40, all ferrets (Groups 1-5) were challenged with a heterologous wt A/Vie/1H/2009 which is an influenza A(H1N1) pdm-like virus (dose: $10^{4.5}$ fTCID$_{50}$ in 280 µl).

Body Temperature

Body Temperature (BT) after Immunization

BT was measured twice daily and BT means for each day of the observation period were calculated. To compare individual body temperature elevations, a background mean body temperature of each ferret was calculated before the first immunization (mean of BT collected at D-3 to D-1), second immunization (mean of BT from D20 and D21) and the challenge infection (mean BT from D38 and D39) and displayed as baseline temperature. Daily mean body temperatures after the first and second immunization oscillated in a narrow delT(° C.) body temperature range of <±0.5° C. during the observation period in each group immunized irrespective of the delNS immunogen (FIG. 1). No relevant significant differences in delT(° C.) daily mean body temperature could be determined between the unimmunized control (Group 5) and immunized groups of ferrets (Groups 1-4). No mean BT elevation outside the physiological BT ranges could be determined in any of the ferret groups following immunizations. These data further confirm the excellent safety profile of delNS based vaccines.

Body Temperature after Challenge Infections

Body temperature increase is a typical symptom of flu in ferrets. Ferrets receiving the Diluent by the i.n. route (Group 5) showed a very strong temperature increase 48 hours after the challenge infection. Specifically, all (6/6) animals developed a rise in the daily BT mean of ≥1° C. The mean BT increased by 1.7° C. above the baseline temperature which is defined as average of BT measurements performed on D38+D39. (FIG. 1, FIG. 2). Ferrets in this group recovered only slowly from the febrile reaction, as indicated by a mean BT increase of >1° C. determined on the next day (D43). Moreover, 4/6 ferrets in this group developed a maximum temperature of 2:40.0° C., which is defined as severe fever. Only ferrets immunized with the heterologous prime/boost immunization schemes H1N1-delNS/H5N1-delNS (Group 2) and H5N1-delNS/H1N1-delNS (Gr. 4) were protected from BT increases ≥1° C. and no severe fever (2:40.0° C.) was measured. In contrast, 2/6 animals in each of the homologous H5N1 and H1N1 prime/boost groups (Group 1 and Group 3) reacted to the challenge infection with a daily mean BT increase ≥1° C. and in the homologous H1N1-delNS prime/boost group 1/6 animals developed severe fever (Table 2).

Highly significant differences (p>0.0001) between the group-specific means of Diluent (Group 5) and all delNS immunized groups (Groups 1-4) were detected 48 hours after the challenge infection (D42). Highly statistically significant differences (p>0.0001) to the Diluent group on D43 were only observed for the heterologous prime/boost groups (Group 2 and Group 4, FIG. 1).

FIG. 1 shows the body temperature differences (delT® C) of ferrets primed i.n., and boosted three weeks later with different delNS-H1N1/delNS-H5N1 combinations and subsequently challenged with an influenza A(H1N1)pdm09-like virus. The mean delT (° C.) body temperatures±SEM (N=6/group) is shown. The baseline body temperature of each ferret was calculated from BT measurements collected at D-3 to D-1 before the first immunization, D20 to D21 before the second immunization and D38 to D39 before the challenge infection. All immunized and control (Diluent) animals were challenged on D40 with the heterologous H1N1pdm virus. The delT(° C.) mean body temperatures±SEM. (N=6/group) are shown. The closed diamonds correspond to group 1 (prime delNS1-H1N1, boost delNS1-H1N1), the open squares to group 2 (prime delNS1-H1N1, boost delNS1-H5N1), closed triangles to group 3 (prime delNS1-H5N1, boost delNS1-H5N1), asterix to group 4 (prime delNS1-H5N1, boost delNS1-H1N1) and open circles to group 5 (prime diluent, boost diluent)

TABLE 2

Number of ferrets with body temperature findings after the challenge infection

| Group/ immunization regimen | No. of ferrets with body temperature findings/total no. of ferrets per group | |
|---|---|---|
| | BT ≥ 40° C. | delT(° C.) ≥ 1° C. |
| 1. delNS-H1N1/delNS-H1N1 | 1/6 | 2/6 |
| 2. delNS-H1N1/delNS-H5N1 | 0/6 | 0/6 |
| 3. delNS-H5N1/delNS-H5N1 | 0/6 | 2/6 |
| 4. delNS-H5N1/deNS-H1N1 | 0/6 | 0/6 |
| 5. Diluent | 4/6 | 6/6 |

In summary the data show that an intranasal prime/boost heterologous immunization regimen in ferrets utilizing delNS-H1N1 and delNS-H5N1 is superior in protecting animals from fever after challenge infection with a distantly related pandemic influenza virus strain. The average maximum temperature increases observed on day 2 after challenge, indicate that a highly advantageous sequence is priming with delNS-H5N1 and boosting with delNS-H1N1 (FIG. 2).

Example 2

Sera were taken after the first and second immunization and before challenge from ferrets immunized as described in Example 1. Briefly, delNS strains containing the HA and NA from influenza New Caledonia H1N1 (H1) and Vietnam H5N1 (H5) were used in different combinations for the prime-boost immunizations (Table 1). The H5/H1 prime-boost combination showed the best ELISA titers against the stem followed by the H1/H5 combination.

The results are shown in FIG. 3.

Figure 3A:
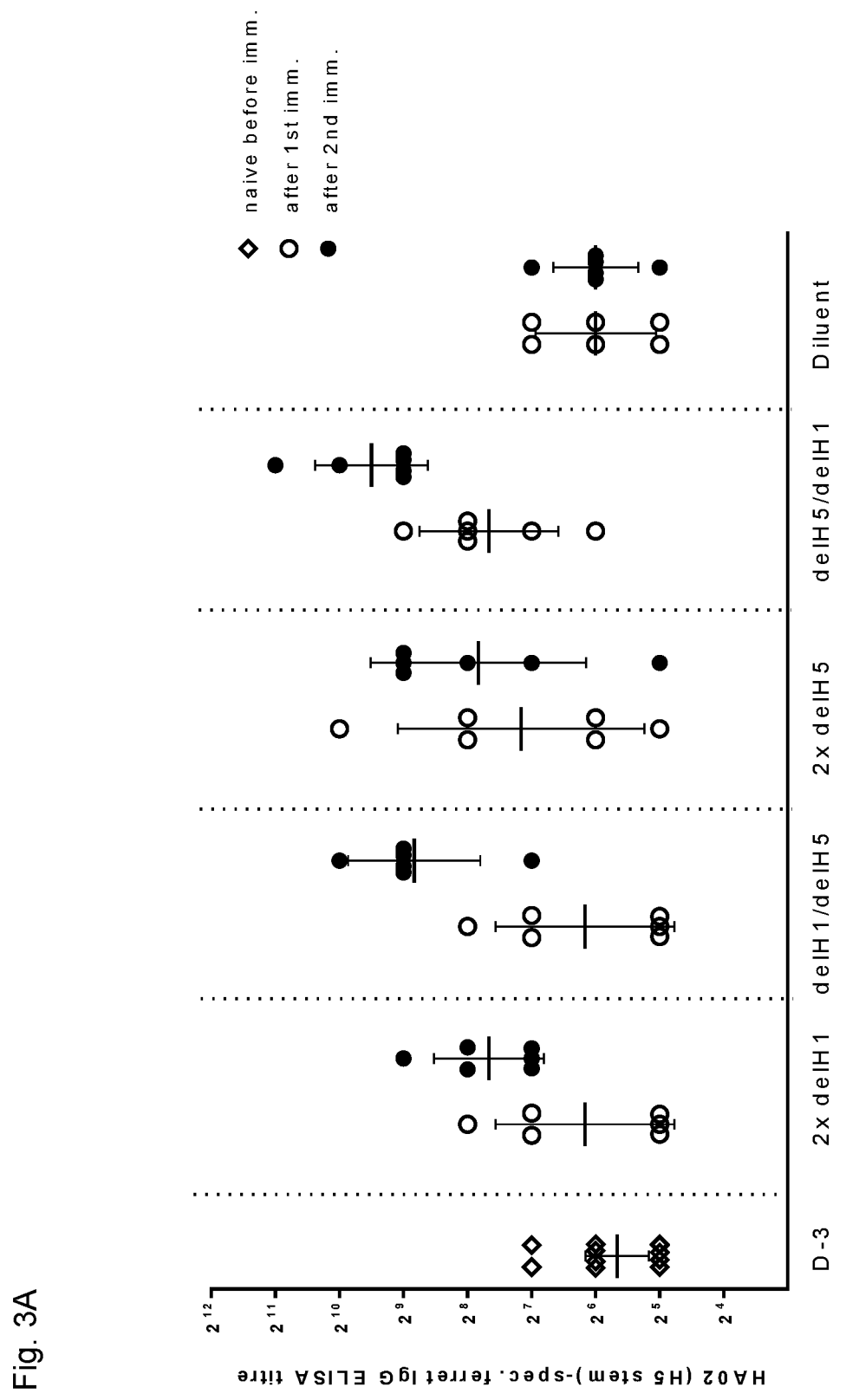
Figure 3B:
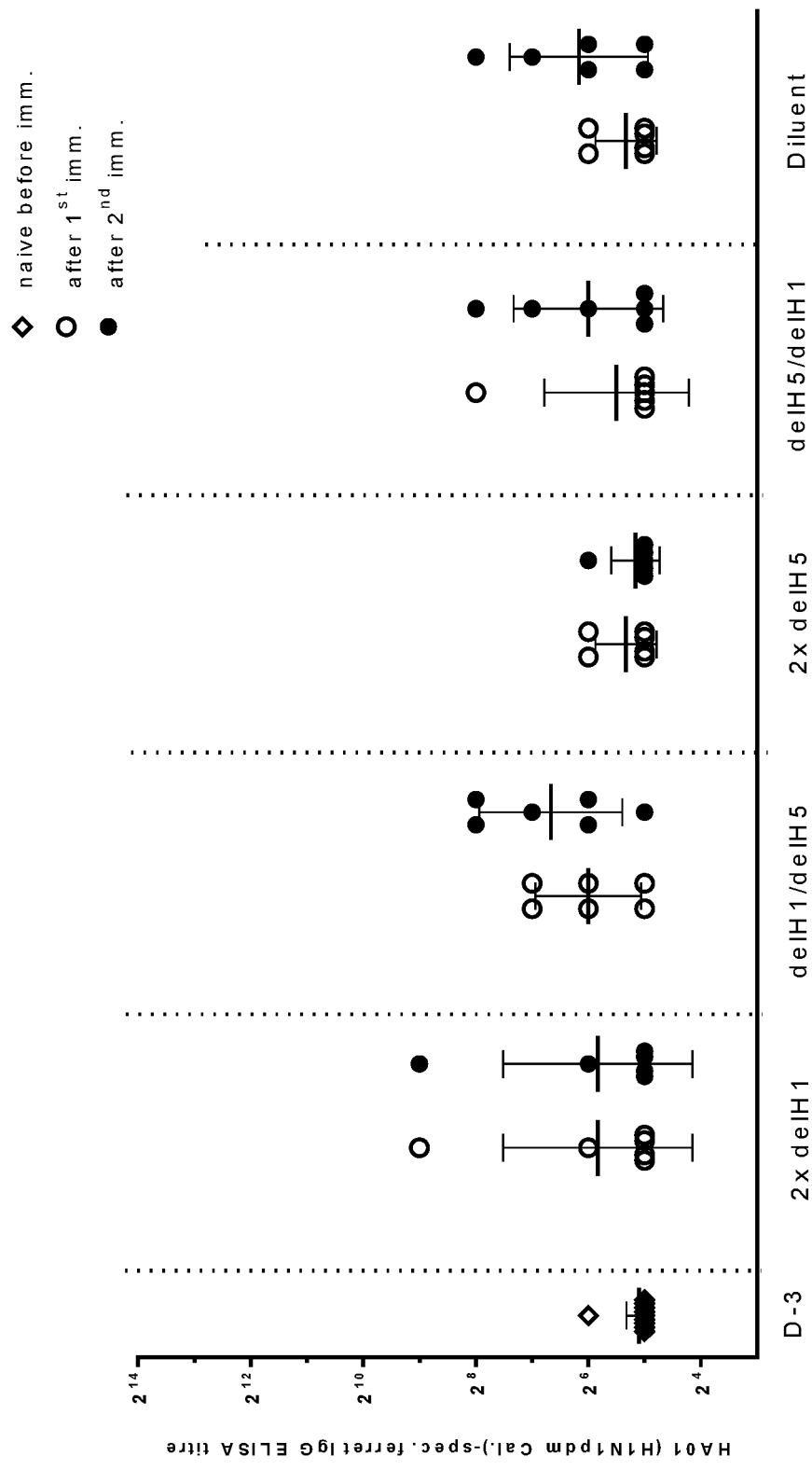

FIG. 3a shows HA2 (stem)-specific ferret serum IgG antibodies. The sera are derived from the same experiment as described in FIG. 1 and were taken after the first and second immunization before challenge. As coating antigen, the HA2 of the Vietnam H5N1 strain, corresponding to the conserved stem, was used. D-3 are naive sera, 2×delH1 were ferrets immunized twice with the delNS-H1N1 New Caledonia strains, delH1/delH5 was primed with delNS-H1N1 New Caledonia and boosted with delNS-H5N1 Vietnam, 2×delH5 twice with delNS-H5N1, delH5-delH1 was primed with delNS-H5N1 Vietnam and boosted with delNS-H1N1, and the diluent group was mock-treated twice with buffer FIG. 3b shows HA1 (head—H1N1pdm09)-specific ferret serum IgG. The HA1 subunit of the pandemic H1N1pdm09 which corresponds to the challenge virus was used as coating antigen. The immunization scheme and the groups are identical to those described in FIG. 3a.

In particular for the heterologous prime/boost combinations very good responses to the stem (FIG. 3a) but no significant antibodies to the HA1 (head) of the challenge strain were induced (FIG. 3b), indicating that antibodies were successfully directed to the conserved HA2 (stem). Moreover, this result indicates that the induced stem antibodies are a major factor for the successful challenge, since the heterologous prime/boost combinations gave superior protection from fever.

Example 3

The aim of this experiment is to evaluate the safety, protection efficacy and the optimal sequence of intranasal administration of the two replication-deficient delNS1 strains delNS-H7N2 (A/Anhui/1/2013) and delNS-H3N2 (A/HK/4801/2014) against challenge with influenza virus A/Brisbane/10/2007(H3N2)-like virus in ferrets. delNS1-H7N2 lacks the complete NS1 open reading frame and was rescued from cDNA clones by co-transfection of plasmids encoding the hemagglutinin and neuraminidase of influenza H7N2, whereas the remaining internal 6 gene segments are from the influenza virus IVR-116 (WHO). IVR-116 is a reassortant with HA and NA genes from influenza A/NewCaledonia/20/99 (H1N1), the PB1 gene from A/Texas/1/77(H3N2), and all other genes from the A/Puerto Rico/8/34 (H1N1)(PR8) virus. Similarly, delNS1-H3N2 was rescued by co-transfecting plasmids derived from the surface glycoproteins from influenza A/H3N2 with plasmids corresponding to the internal gene segments derived from the influenza virus strain IVR-116. The NS1 open reading frame was deleted from the NS gene segment of IVR-116 (Wacheck et al., 2010).

Prime/Boost delNS-H7N2/delNS-H3N2 in Ferret Model:

TABLE 3

| | Allocation and dosing | | | |
|---|---|---|---|---|
| Group | Animals, Sex | Prime (Day 1) | Boost (Day 22) | Challenge (Day 40) |
| 1 | 3 M + 3 F | delNS-H3N2 | delNS-H3N2 | H3N2 Brisbane |
| 2 | 3 M + 3 F | delNS-H3N2 | delNS-H7N2 | H3N2 Brisbane |
| 3 | 3 M + 3 F | delNS-H7N2 | delNS-H7N2 | H3N2 Brisbane |
| 4 | 3 M + 3 F | delNS-H7N2 | delNS-H3N2 | H3N2 Brisbane |
| 5 | 3 M + 3 F | diluent | diluent | H3N2 Brisbane |

The ferrets of Group 1 and Group 2 (N=6/group) are immunized i.n. on study day 1 (D1) with delNS-H3N2 (dose: $10^{8.0}$ fTCID$_{50}$ in 280 µl). Ferrets of Group 3 and Group 4 are immunized i.n. with delNS-H7N2 (dose: $10^{8.0}$ fTCID$_{50}$ in 280 µl). On D22, ferrets in Gr. 1 and Gr. 4 are boosted i.n. with delNS-H3N2 (dose: $10^{8.0}$ fTCID$_{50}$ in 280 µl), whereas ferrets in Group 2 and Group 3 i.n. receive delNS-H7N2 (dose: $10^{8.0}$ fTCID$_{50}$ in 280 µl). Ferrets of Group 5 (N=6/group) are i.n. immunized with 280 µl of diluent (SHNP buffer)/ferret on D1 and D22.

Alternatively, instead of giving the first and second immunization i.n., the second immunization is given intramuscularly or subcutaneously.

As an alternative option to the delNS-H7N2 strain a distantly related delNS-H3N2 strain to the A/HK/4801/2014 H3N2-delNS strain such as the influenza A/Panama/2007/99 H3N2-delNS is used as second strain for the described prime/boost experiment.

At D40, all ferrets (Groups 1-5) are challenged with a heterologous H3N2 A/Brisbane/10/2007 wild-type virus (dose: $10^{4.5}$ fTCID$_{50}$ in 280 µl).

Body Temperature (BT)

As measure of protection, BT is measured twice daily and BT means for each day of the observation period are calculated. To compare individual body temperature elevations, a background mean body temperature of each ferret is calculated before the first immunization (mean of BT collected at D-3 to D-1), second immunization (mean of BT from D20 and D21) and the challenge infection (mean BT from D38 and D39) and displayed as baseline temperature.

Example 4

The aim of this experiment is to evaluate the safety, protection efficacy and the optimal sequence of administration of the two replication-deficient delNS strains delNS-B/Yamagata (B/Phuket/3073/2013) and delNS-B/Victoria (B/Brisbane/60/2008) against challenge with a distantly related influenza B wild-type virus such as B/Beijing/184/93 in ferrets. delNS1-B/Yamagata lacks the complete NS1 open reading frame and was rescued from cDNA clones by co-transfection of plasmids encoding the hemagglutinin and neuraminidase of influenza (B/Phuket/3073/2013), whereas the remaining internal 6 gene segments are from influenza virus B/Thueringen/2/06 lacking the NS1 gene. delNS1-B/Victoria was rescued by co-transfecting plasmids derived from the surface glycoproteins from influenza B/Brisbane/60/2008 with plasmids corresponding to the internal gene segments derived from the influenza virus strain B/Thueringen/2/06 lacking the NS1 gene.

Prime/Boost: deINS1-B/Yamagata (deINS-BY) and deINS1 B/Victoria (deINS-BV) In Ferret Model:

TABLE 4

Allocation and dosing

| Group | Animals, Sex | Prime (Day 1) | Boost (Day 22) | Challenge (Day 40) |
|---|---|---|---|---|
| 1 | 3 M + 3 F | deINS-BY | deINS-BY | B/Beijing/184/93 |
| 2 | 3 M + 3 F | deINS-BY | deINS-BV | B/Beijing/184/93 |
| 3 | 3 M + 3 F | deINS-BV | deINS-BV | B/Beijing/184/93 |
| 4 | 3 M + 3 F | deINS-BV | deINS-BY | B/Beijing/184/93 |
| 5 | 3 M + 3 F | diluent | diluent | B/Beijing/184/93 |

The ferrets of Group 1 and Group 2 (N=6/group) are immunized i.n. on study day 1 (D1) with deINS-BY (dose: $10^{8.0}$ fTCID$_{50}$ in 280 µl). Ferrets of Group 3 and Group 4 are immunized i.n. with deINS-BV (dose: $10^{8.0}$ fTCID$_{50}$ in 280 µl). On D22, ferrets in Gr. 1 and Gr. 4 are boosted i.n. with deINS-BY (dose: $10^{8.0}$ fTCID$_{50}$ in 280 µl), whereas ferrets in Group 2 and Group 3 i.n. receive deINS-BV (dose: $10^{8.0}$ fTCID$_{50}$ in 280 µl). Ferrets of Group 5 (N=6/group) are i.n. immunized with 280 µl of diluent (SHNP buffer)/ferret on D1 and D22.

Alternatively, instead of giving the first and second immunization i.n., the second immunization is given intramuscularly or subcutaneously.

At D40, all ferrets (Groups 1-5) are challenged with a heterologous wt such as B/Beijing/184/93 (dose: $10^{4.5}$ fTCID$_{50}$ in 280 µl).

Body Temperature (BT)

As measure of protection BT is measured twice daily and BT means for each day of the observation period are calculated. To compare individual body temperature elevations, a background mean body temperature of each ferret is calculated before the first immunization (mean of BT collected at D-3 to D-1), second immunization (mean of BT from D20 and D21) and the challenge infection (mean BT from D38 and D39) and displayed as baseline temperature.

The invention claimed is:

1. A method for vaccinating a subject at risk of influenza infection using a two-component vaccine comprising replication deficient influenza virus strains with native hemagglutinin (HA) and lacking a functional NS gene (delNS1 influenza), comprising:
   i. administering a priming composition comprising one, two or three delNS1 influenza virus strains selected from group 1 influenza A virus having group 1 HA, group 2 influenza virus having group 2 HA, or group 3 influenza virus having influenza B HAs from the Victoria and Yamagata lineages, formulated for prime-administration; and then
   ii. administering a boosting composition comprising one, two or three delNS1 influenza virus strains of the same group as in the priming composition but antigenically differing in the HA, formulated for boost-administration.

2. The method of claim 1, wherein the group 1 influenza virus consists of H1N1 and H5N1 influenza A virus, and/or the group 2 influenza virus consists of H3N1 and H7N1 influenza A virus.

3. The method of claim 1, wherein the HA head is antigenically different.

4. The method of claim 1, wherein the boosting composition is administered 2 to 8 weeks after the priming composition.

5. The method of claim 4, wherein the boosting composition is administered about 3 weeks after the priming composition.

6. The method of claim 1, wherein the delNS1 influenza virus of the priming composition comprises a native HA with a H5 HA head, and the delNS1 influenza virus of the boosting composition comprises a native HA with a H1 HA head.

7. The method of claim 1, wherein the delNS1 influenza virus of the priming composition comprises a native HA with an H1 HA head, and the delNS1 influenza virus of the boosting composition comprises a native HA with an H5 HA head.

8. The method of claim 1, wherein the delNS1 influenza virus of the priming composition comprises a native HA with an H3 HA head, and the delNS1 influenza virus of the boosting composition comprises a native HA with an H7 HA head, or wherein the delNS1 influenza virus of the priming composition comprises a native HA with an H7 HA head, and the delNS1 influenza virus of the boosting composition comprises a native HA with an H3 HA head.

9. The method of claim 1, wherein the delNS1 influenza virus of the priming composition comprises a native HA with a B/Victoria HA, and the delNS1 influenza virus of the boosting composition comprises a native HA with a B/Yamagata lineage HA, or wherein the delNS1 influenza virus of the priming composition comprises a native HA with a B/Yamagata lineage HA, and the delNS1 influenza virus of the boosting composition comprises a native HA with a B/Victoria lineage HA.

10. The method of claim 1, wherein the priming composition comprises delNS1 influenza virus of group 1, group 2 influenza A, and group 3 and the boosting composition comprises delNS1 influenza virus corresponding to the virus types of the priming composition, which delNS1 influenza virus differs antigenically in the HA head from the delNS1 influenza virus of the priming composition.

11. The method of claim 1, wherein the priming and boosting compositions are trivalent, comprising group 1, group 2 and group 3 influenza virus strains.

12. The method of claim 1, wherein the subject is human, avian, equine, canine, feline, or porcine.

13. A kit for prime-boost vaccination comprising at least two vials, wherein a first vial contains a priming composition comprising one, two or three delNS1 influenza virus strains from group 1 influenza A virus, group 2 influenza virus and/or group 3 influenza virus, wherein the group 3 influenza viruses consist of Victoria and/or Yamagata influenza B viruses, and wherein a second vial contains a boosting composition comprising one, two or three delNS1 influenza virus strains of the same group as in the priming composition but with an antigenically different HA head.

14. The kit according to claim 13, wherein the group 1 influenza virus consists of H1N1 and H5N1 influenza A virus, and/or the group 2 influenza virus consists of H3N1 and H7N1 influenza A virus.

* * * * *